(12) United States Patent
VenkataRaman et al.

(10) Patent No.: US 8,879,384 B2
(45) Date of Patent: Nov. 4, 2014

(54) FAST UPSTREAM SOURCE FAILURE DETECTION

(75) Inventors: Srikrishnan VenkataRaman, Santa Clara, CA (US); Sandeep Bishnoi, San Jose, CA (US); Pradeep G. Jain, Sunnyvale, CA (US); Kanwar D. Singh, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 811 days.

(21) Appl. No.: 12/654,909

(22) Filed: Jan. 8, 2010

(65) Prior Publication Data

US 2011/0063973 A1   Mar. 17, 2011

Related U.S. Application Data

(60) Provisional application No. 61/276,607, filed on Sep. 14, 2009.

(51) Int. Cl.
| | |
|---|---|
| *H04L 12/26* | (2006.01) |
| *H04L 12/24* | (2006.01) |
| *H04L 12/18* | (2006.01) |
| *H04L 12/761* | (2013.01) |
| *H04L 12/707* | (2013.01) |
| *H04L 12/703* | (2013.01) |
| *H04L 12/723* | (2013.01) |

(52) U.S. Cl.
CPC ........ *H04L 41/0659* (2013.01); *H04L 12/1877* (2013.01); *H04L 12/2697* (2013.01); *H04L 43/0817* (2013.01); *H04L 43/50* (2013.01); *H04L 45/16* (2013.01); *H04L 45/22* (2013.01); *H04L 45/28* (2013.01); *H04L 45/50* (2013.01)

USPC .......................................... 370/228; 370/248

(58) Field of Classification Search
USPC ......... 370/216–218, 225, 228, 241–242, 244, 370/248, 250
See application file for complete search history.

(56) References Cited

U.S. PATENT DOCUMENTS

| | | | |
|---|---|---|---|
| 8,121,041 B2 * | 2/2012 | Sajassi et al. ................. | 370/248 |
| 2007/0165515 A1 * | 7/2007 | Vasseur ........................ | 370/216 |
| 2008/0112331 A1 * | 5/2008 | Long et al. .................... | 370/245 |

(Continued)

FOREIGN PATENT DOCUMENTS

WO    WO 2009/018113    2/2009

OTHER PUBLICATIONS

International Search Report dated Dec. 16, 2010 for corresponding Application No. PCT/US2010/048194.

(Continued)

*Primary Examiner* — Michael Thier
*Assistant Examiner* — Feben M Haile
(74) *Attorney, Agent, or Firm* — Harness, Dickey & Pierce

(57) ABSTRACT

One example embodiment of the method includes receiving first control packets, by a first node, from a source node. The first control packets indicate the status of the source node. Whether the source node is operational and if a connection path between the first node and the source node is operational is determined based on the received first control packets. The method further includes sending a second control packet to a downstream node if the source node is non-operational, or the connection is non-operational. The second control packet includes at least one value indicating the source node is unreliable.

17 Claims, 5 Drawing Sheets

(56) References Cited

U.S. PATENT DOCUMENTS

2008/0123521 A1      5/2008   Vasseur et al.
2009/0022070 A1*     1/2009   Iovanna et al. .............. 370/256
2009/0161560 A1*     6/2009   He et al. ..................... 370/242
2010/0061252 A1*     3/2010   Kini et al. ................... 370/248
2010/0260197 A1*    10/2010   Martin et al. ................ 370/408

OTHER PUBLICATIONS

International Search Report dated Mar. 29, 2012 for corresponding Application No. PCT/US2010/048194.

D. Katz et al., "Bidirectional Forwarding Detection draft-ietf-bfd-base-08.txt" Mar. 2008, http://tools.ietf.org/html/draft-ietf-bfd-base-08.

D. Katz et al., "BFD for Multipoint Networks draft-katz-ward-bfd-multipoint-02.txt" Feb. 2009, http://tools.ietf.org/html/draft-katz-ward-bfd-multipoint-02.

L. Andersson et al., "LDP Specification" Jan. 2001, http://www.ietf.org/rfc/rfc3036.txt.

D. Awduche et al., "RSVP-TE: Extensions to RSVP for LSP Tunnels" Dec. 2001, http://www.ietf.org/rfc/rfc3209.txt.

E. Rosen et al., "Multiprotocol Label Switching Architecture" Jan. 2001, http://www.ietf.org/rfc/rfc303_1.txt.

* cited by examiner

FAST UPSTREAM SOURCE FAILURE DETECTION

PRIORITY STATEMENT

This application claims priority under 35 U.S.C. §119(e) to U.S. Provisional Patent Application No. 61/276,607, filed on Sep. 14, 2009, in the United States Patent and Trademark Office (U.S.P.T.O.), the entire contents of which is hereby incorporated herein by reference.

BACKGROUND OF THE INVENTION

Embodiments relate to detecting upstream source, e.g., a video source, failure in a point to multi-point network. As is known, the Bidirectional Forwarding Detection protocol (BFD) specifies a method for verifying connectivity between a pair of systems. BFD provides verification of multipoint connectivity between a multipoint sender (the "head") and a set of multipoint receivers (the "tails"). Typically BFD allows for the tails to detect a lack of connectivity from the head. For example, the tail may notify the head of the lack of multipoint connectivity. Because the receivers are detecting the failure, there may be an unacceptable interruption of services to the receiver.

SUMMARY OF THE INVENTION

Embodiments relate to detecting upstream source, e.g., a video source, failure in a point to multi-point network. For example, embodiments relate to detecting failure of a source, for example a video source, at an ingress node of a point to multi-point network, where, for example, native video IP multicast traffic is received from the source, e.g., the video source, and sent down point to multi-point network paths from the ingress node.

The ingress node may be either directly connected to the source, e.g., the video source, or connected via a network. Resource reservation protocol-traffic engineering (RSVP-TE) based point to multi-point label switched paths (LSP) may be one of the techniques for sending the video traffic in the core network. Upon detecting a source, e.g., video source, failure, the ingress node may communicate the failure to all the potential egress (or destination) nodes that are receiving video traffic.

Upon receipt of the failure notification, egress (or destination) nodes may switch and start receiving the traffic from an alternate path. Example embodiments may provide an improved failover time (e.g., sub 1s) in egress nodes.

One embodiment includes a method of detecting upstream source, e.g., video source, failure in a point to multi-point network. The method includes receiving first control packets, by a first node (e.g., ingress node), from a source (e.g., video source) node. The first control packets indicate the status of the source node. Whether the source, e.g., video source, node is operational and if a connection path between the first node and the source node is operational is determined based on the received first control packets. The method further includes sending a second control packet to a downstream node (e.g., egress or destination nodes) if the source node is non-operational or the connection is non-operational. The downstream node is a node downstream from the first node (e.g., ingress node). The second control packet includes at least one value indicating the source, e.g., video source, node is unreliable.

One embodiment includes a network node of a point to multi-point network. The node includes a first port configured to communicate with a source, e.g., video source, node. The network node includes a second port configured to communicate with a downstream node (e.g., egress or destination nodes). The downstream node (e.g., egress or destination nodes) is a node downstream from the node. The network node further includes a processor configured to receive first control packets from the source, e.g., video source, node. The first control packets indicate the status of the source node. The processor is further configured to determine if the source, e.g., video source, node is operational and if a connection path between the first node (e.g., ingress node) and the source, e.g., video source, node is operational. The determination is based on the received first control packets. The processor sends a second control packet to the downstream node (e.g., egress or destination nodes) if the source node is non-operational or the connection is non-operational. The second control packet includes at least one value indicating the source, e.g., video source, node is unreliable.

One embodiment includes a method of detecting upstream source, e.g., video source, failure in a point to multi-point network. The method includes receiving data packets and primary control packets at a destination node, e.g., an egress or destination node. The data packets and primary control packets are received at a fixed time interval via a primary path in the point to multi-point network. The data packets are an information stream, e.g., video data, received from a source, e.g., video source, node. The primary control packets indicate the availability of the source, e.g., video source, node and a condition of the primary path.

The method further includes determining if the primary control packets have been received by the destination node, e.g., egress (or destination) nodes, within the fixed time interval. The method switches the source, e.g., video source, of the data packets from the primary path to the secondary path if the primary control packets have not been received within the fixed time interval. After the switch, the destination node receives the data packets and secondary control packets via the secondary path.

One embodiment includes a network node (e.g., egress or destination nodes) of a point to multi-point network. The node (e.g., egress (or destination) nodes) includes a first port configured to receive primary data packets and primary control packets via a primary data path in the point to multi-point network. The primary data packets are an information stream, e.g., video data. The primary control packets indicate the availability of the source, e.g., video source, of the information and a condition of the primary path. The network node (e.g., egress or destination nodes) includes a second port configured to receive secondary data packets and secondary control packets via a secondary data path in the point to multi-point network. The secondary control packets indicate the availability of the source, e.g., video source, of the information and a condition of the secondary path. The network node (e.g., egress or destination nodes) further includes a processor configured to receive the primary control packets at a fixed time interval. The processor determines if the primary control packets have been received within the fixed time interval. The processor switches the source, e.g., video source, of the data packets from the primary data path to the secondary data path if the primary control packets have not been received within the fixed time interval.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
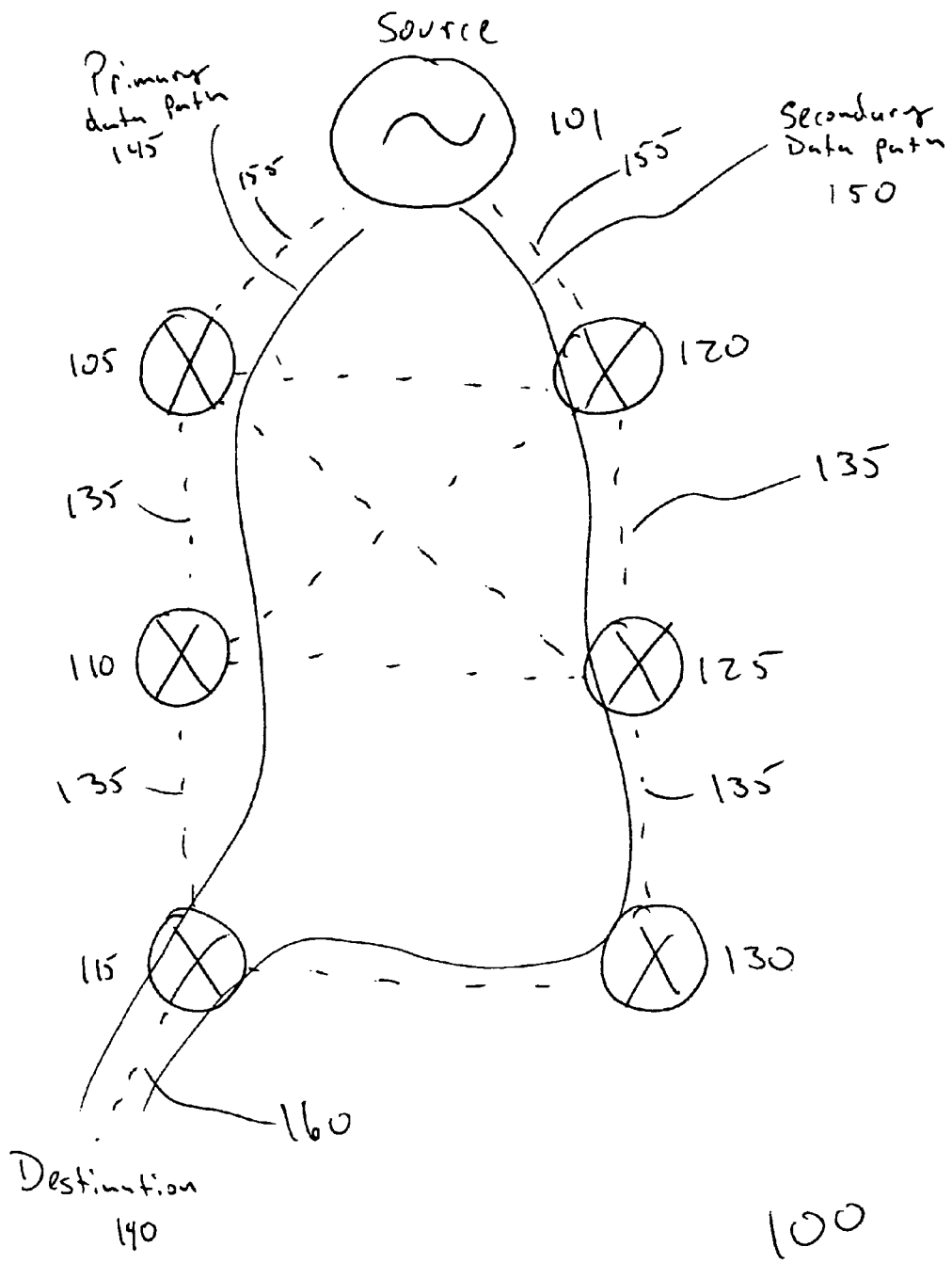
FIG. 1 illustrates an exemplary point to multi-point network.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

FIG. 1 illustrates an exemplary point to multi-point network 100. The point to multi-point network may include one or more ingress or root nodes 105, 120. The point to multi-point network may include one or more egress, destination or leaf nodes 115, 130. The point to multi-point network may include one or more intermediate or branch nodes 110, 125. In addition, the point to multi-point network may include one or more interconnecting links 135 to interconnect one or more of the nodes.

A source node, e.g., a video source, 101 may be connected to one or more of the ingress or root nodes 105, 120 via a network or an interconnecting link 155. A destination 140 may be connected to one or more of the egress, destination or leaf nodes 115, 130 via a network or an interconnecting link 160.

The point to multi-point network 100 may be a wired network, a wireless network, or a combination of both. The source node 101 may be a video source (e.g., a television station or an on demand movie video stream). The destination 140 may be a user with a video display (e.g., a television or a hand held video device). A node 105, 110, 115, 120, 125, or 130 may be a router or a switch (e.g., a label switched router (LSR) or an ATM switch). An interconnecting link 135 may be wired (e.g., a coaxial link or a fiber link) or wireless.

The interconnecting link 155 from the source node, e.g., video source, 101 to the ingress or root node 105, 120 may be a direct link via, for example, an internet protocol layer 1 connection or a remote link via, for example, an internet protocol layer 3 routing or layer 2 switching. The interconnecting link 160 from the destination 140 to the egress, destination or leaf node 115, 130 may be a direct link via, for example, an Internet protocol layer 1 connection or a remote link via, for example, an internet protocol layer 3 routing.

The point to multi-point network 100 may include one or more data paths, for example, a primary data path 145 or a secondary data path 150. A data path includes an ingress or root node (e.g., node 105), an egress, destination or leaf node (e.g., node 115), one or more intermediate or branch nodes (e.g., node 110) and one or more interconnecting links (e.g., links 155, 135 and 160). A data path may be a virtual data path or a tunnel.

The point to multi-point network 100 may be a multi protocol label switching (MPLS) network as set forth in RFC 3031. A MPLS network is a network that directs and carries data from one network node (e.g., node 125) to the next. The data may be data packets that are an information stream, e.g., video data, received from a source, e.g., video source, node. A network node may be known as a hop within the network. A MPLS network may allow for creation of virtual links between nodes. A MPLS network may encapsulate packets of various network protocols.

Data packets in a MPLS network may be assigned labels. Forwarding decisions may be made based on the contents of the label without concern of the contents of the data packet. The data packets include a MPLS header including one or more labels. The labels are then used to forward the data packet to the next node or hop. As is known in the art, the operation of nodes may vary based on whether the node is an ingress/egress node (e.g., nodes 105 or 115) or an intermediate node (e.g., node 110).

The point to multi-point network 100 may use resource reservation protocol-traffic engineering (RSVP-TE), as set forth in RFC 3209, to define data paths. RSVP-TE may be used to establish MPLS label switched paths (LSP) taking into consideration network constraint parameters (e.g., bandwidth, packet loss ratio and maximum packet transfer delay) and explicit route. RSVP being a transport layer protocol configured to reserve resources across a network for an integrated services Internet and TE being an extension of RSVP and configured to consider network constraint parameters when reserving network resources. An explicit route is a data path that has each node or hop in the data path defined as the data path is established. A data path may also be known as a multicast tree or a point to multi-point LSP multicast tree in the MPLS network.

Figure 2A:
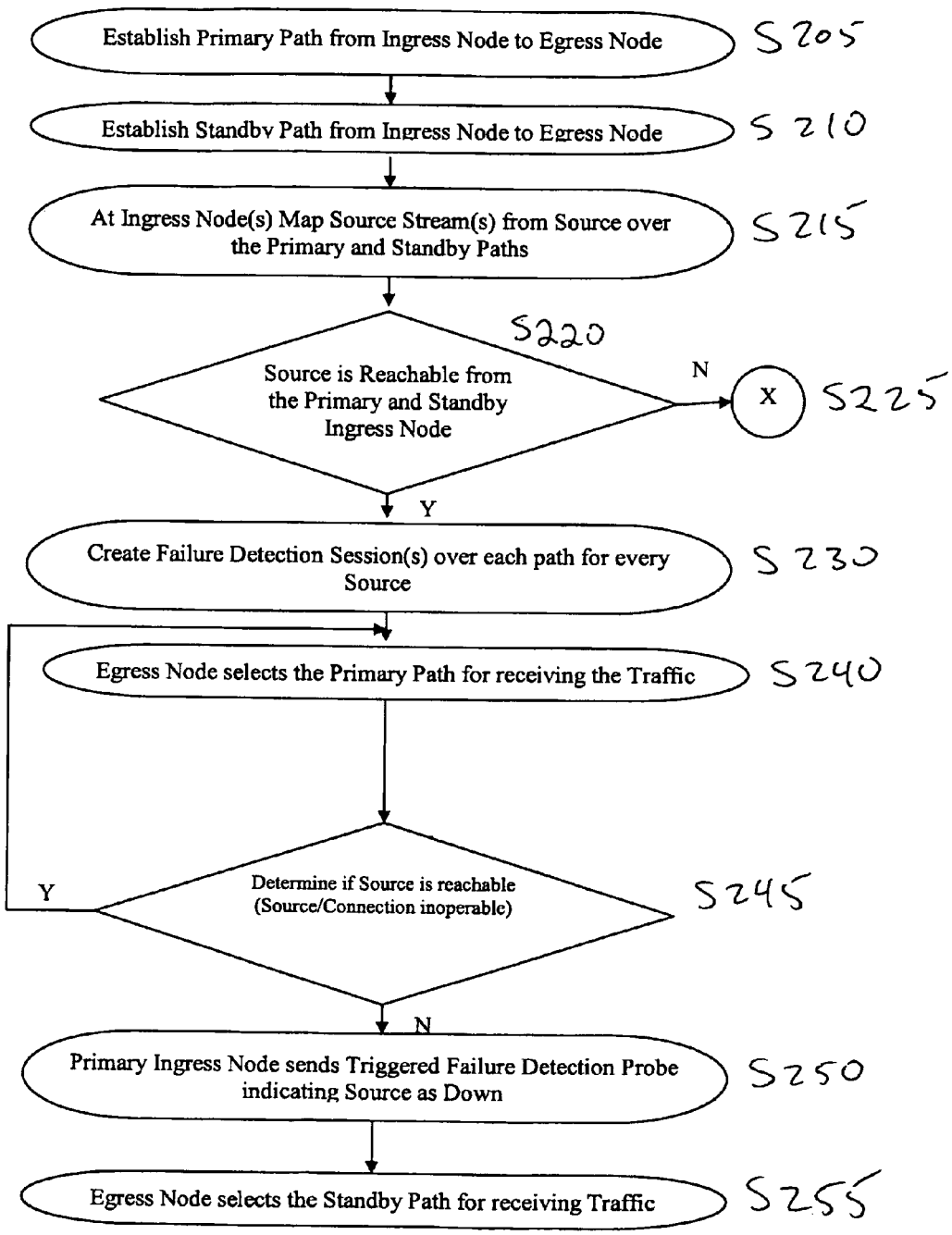
FIGS. 2A and 2B illustrate a method for detecting source, e.g., video source, failure in a point to multi-point network according to an example embodiment.

FIG. 2A illustrates an example embodiment of a method for detecting source node, e.g., video source, failure in a point to multi-point network. In describing FIG. 2A the terms unreachable, non-operational, unreliable and unavailable are used interchangeably with regard to the source node, e.g., video source, 101. Unreachable may be defined as the link between the source node, e.g., video source, 101 and the ingress node 105 may be inoperable. Whereas unavailable may be defined as the source node, e.g., video source, 101 is unreachable or, in addition, the source node, e.g., video source, 101 may be inoperable. Non-operational may include both unreachable and unavailable with regard to example embodiments. The terms reachable, operational, reliable and available are used interchangeably to define the opposite of the above described terms.

In step S205 a primary data path 145 may be established by, for example, the ingress node 105. The primary data path 145 is a data path from the ingress node 105 to the egress (or destination) node 115, and including any intermediate nodes and interconnecting links.

A data path or route may be defined in one of two ways. First, a data path may be defined as hop by hop routing. Hop by hop routing allows each node to independently choose the next hop for each forwarding equivalence class (FEC). A FEC is a group of IP packets which are forwarded in the same manner (e.g., over the same path, with the same forwarding treatment).

Second, a data path may be explicitly defined. In an explicitly routed label switched path (LSP) data path, each node does not independently choose the next hop. A single node, generally the ingress node, specifies the nodes in the LSP.

As is known by those skilled in the art, RFC 3209 describes how to use MPLS to define an explicit data path. Example embodiments will be described using RFC 3209 as a reference, but example embodiments are not limited thereto.

An explicit route is established by a node, typically an ingress node 105, 120, sending a path message including an EXPLICIT_ROUTE object. The contents of an EXPLICIT_ROUTE object are a series of variable length data items called subobjects. Each subobject includes at least a list of nodes or hop addresses.

The concept of explicitly routed label switched paths can be generalized through the notion of abstract nodes. An abstract node is a group of nodes whose internal topology is opaque to the ingress node of the LSP. An abstract node is said to be simple if it contains only one physical node. Using this concept of abstraction, an explicitly routed LSP can be specified as a sequence of IP prefixes or a sequence of Autonomous Systems. A subobject may be said to include a list of abstract nodes.

A node receiving a path message containing an EXPLICIT_ROUTE object must determine the next hop for this path. This is necessary because the next node in the list of nodes for the explicit route might be an IP subnet or an Autonomous System. Therefore, selection of this next hop may involve a decision from a set of feasible alternatives. To determine the next hop for the path, a node receiving the path message may perform at least the following steps:

The node receiving the path message first evaluates the first subobject. If the node is not one of the nodes in the list of nodes described by the first subobject, the node has received the path message in error and may return a "Bad initial subobject" error. If there is no first subobject, the message is also in error and the system may return a "Bad EXPLICIT_ROUTE object" error. If there are no errors, the node continues to evaluate the path message.

If there is no second subobject, this indicates the end of the explicit route (e.g., the node is the last node in list of nodes). Therefore, the EXPLICIT_ROUTE object may be removed from the Path message.

If there is a second subobject, the node evaluates the second subobject. If the node is one of the nodes in the list of nodes described by the second subobject, then the node deletes the first subobject and continues processing as above. Note that this makes the second subobject into the first subobject of the next iteration and allows the node to identify the next node in the list of nodes in the path of the message after possible repeated application(s) of the above steps.

The node then selects a next hop within the list of nodes of the first subobject (which the node belongs to) that is along the path to the next node of the list of nodes associated with the second subobject.

Finally, the node replaces the first subobject with any subobject that denotes a node of the list of nodes containing the next hop. This is necessary so that when the path message is received by the next hop, it will be accepted.

The above description for establishing a data path using the explicit route method as defined in RFC 3209 is exemplary and example embodiments are not limited to the above method in any way. As referenced above, a data path may also be defined by a hop by hop route or any other path definition as is known to those skilled in the art and the choice may be a design decision.

In step S210 ingress node 120 establishes a standby data path 155. The standby data path 155 is a data path from the ingress node 120 to the egress (or destination) node 115, and including any intermediate nodes and interconnecting links. The standby data path 155 may be established using the same methods used to establish the primary data path 145 as described above with regard to step S205.

As set forth in RFC 3036, a set of procedures and messages is established by which Label Switched Routers (LSR(s)) establish label switched paths (LSP(s)) through a network by mapping network-layer routing information directly to data-link layer switched paths. The LSP(s) may have an endpoint at a directly attached neighbor, or may have an endpoint at a network egress (or destination) node, enabling switching via all intermediary nodes. The process of mapping network-layer routing information directly to data-link layer switched paths is known by those skilled in the art as mapping source streams.

In step S215 the ingress nodes (e.g., nodes 105 and 120) map source streams from the source node, e.g., video source, 101 over the primary 145 and standby 155 paths.

In step S220 the ingress nodes (e.g., nodes 105 and 120) determine if the source node, e.g., video source, 101 is reachable. In an example embodiment, control messages, configured by, for example, the source node, e.g., video source, 101 or the ingress node 105, are sent by the source node, e.g., video source, 101 and received by the ingress node 105. If the source node, e.g., video source, 101 is directly connected to the ingress node 105 by, for example, an internet protocol (IP) layer 1 connection, control messages may include link down or link up status indicators or events associated with layer 1 failure detection for the source node, e.g., video source, 101. If the source node, e.g., video source, 101 is connected to the ingress node 105 via a network connection, control messages may include route tracking and response messages between the ingress node 105 and the source node, e.g., video source, 101. If the source node, e.g., video source, 101 is not reachable or unreliable, the method moves to step S225 and ends. Otherwise, control moves to step S230.

The source node, e.g., video source, 101 may be reachable if the control message is received, the control message indicates the link is up, and the source node, e.g., video source, 101 is directly connected to the ingress node 105. For example, the control messages may include link down or link up status indicators for the source node, e.g., video source, 101. The source node, e.g., video source, 101 may also be reachable if the route tracking message is received, the route tracking message indicates the source node, e.g., video source, is available, and the source node, e.g., video source, 101 is connected to the ingress node 105 through a network.

By contrast, the source node, e.g., video source, 101 may be unreachable or unreliable if the control message is not received or the control message indicates the link is down if the source node, e.g., video source, 101 is directly connected to the ingress node 105. The source node, e.g., video source, 101 may also be unreachable or unreliable if the route tracking message is not received or the route tracking message indicates the source node, e.g., video source, is unavailable if the source node, e.g., video source, 101 is connected to the ingress node 105 through a network.

In step S230 the ingress node 105 creates failure detection sessions. The failure detection sessions may be unidirectional failure detection (UFD) sessions over point to multi-point networks. UFD is a subset of the bidirectional forwarding detection (BFD) protocol. The UFD protocol being a known protocol configured to detect and communicate failures between nodes of a network.

As is known by those skilled in the art, Katz et al., "BFD for Multipoint Networks draft-katz-ward-bfd-multipoint-02," Feb. 5, 2009 (henceforth referred to as Katz-02) describes how to use BFD in a multipoint network. Example embodiments will be described using Katz-02 as a reference, but example embodiments are not limited thereto.

Several BFD diagnostic codes or flags as set forth in Katz-02 include "No Head", "Unreliable Head" and "Semi-Reliable Head". The "No Head" flag indicates that a single path has failed. The "Unreliable Head" flag indicates that a multipoint path has failed. The "Semi-Reliable Head" flag indicates that a forward path has failed but a reverse path is operational.

A head node is the first node in a path. A tail node is the last node in the path, although one tail is described in this disclosure, one skilled in the art will understand that there may be more than one tail. For example, the head node may be ingress node 105 and the tail node may be node 115.

As is known, multipoint BFD, BFD for multi-point networks, is modeled as a set of sessions of different types. The elements of procedure differ slightly for each type. The different types include PointToPoint, MultipointClient, MultipointTail, MultipointHead, MulticastHead, MulticastClient and MulticastTail. For example, point-to-point sessions are of type PointToPoint. The PointToPoint session indicates the multipoint BFD is a classic point-to-point BFD. As another example, a head node has a session of type MultipointHead. The MultipointHead session is a session on the head node responsible for the periodic transmission of multipoint BFD control packets along a multipoint tree. The multipoint BFD control packets may include several fields including, e.g., My Discr and Your Discr.

My Discr is a unique, nonzero discriminator value generated by the transmitting node, used to demultiplex multiple BFD sessions between the same pair of nodes. Your Discr is received from the corresponding remote node. Your Discr reflects back the received value of My Discr, or is zero if that value is unknown Still another multipoint BFD session type example is if the head is monitoring some or all of the tails, the head has a session of type MultipointClient per tail that the head is monitoring. The MultipointClient session is a session on the head that tracks the state of an individual tail. In addition, each tail has a session of type MultipointTail associated with a multipoint tree. The MultipointTail session is simply a multipoint session on a tail.

For ease of description the nodes will be referred to when discussing the head and the tail. Ingress node 105 has a session of type MultipointHead that is bound to multipoint path (or multipoint tree). Multipoint BFD Ccontrol packets are sent in this session over the multipoint path, and no BFD control packets are received by ingress node 105. If ingress node 105 is keeping track of egress (or destination) node 115, ingress node 105 has a session of type MultipointClient for egress node 115 (and any other tails associated with the path).

As is known, all of the MultipointClient sessions for tails (e.g., egress or destination node 115) on a particular multipoint path are grouped with the MultipointHead session to which the clients are listening. Each tail (e.g., egress or destination node 115) has a session of type MultipointTail associated with a multipoint path. As is known, these sessions receive BFD control packets from ingress node 105, both as multipoint packets (the MultipointHead session) and as unicast packets (the MultipointClient session, if it exists.)

As discussed above, control packets in a MultipointHead session include Your Discr and My Discr, which identify the transmitting node (e.g., ingress node 105). In particular, ingress node 105 sends the multipoint BFD control packets over the MultipointHead session. The multipoint BFD control packets have My Discr set to a value bound to the multipoint path, and Your Discr set to zero. Egress (or destination) node 115 may demultiplex these packets based on a combination of the source address and My Discr, which together uniquely identify ingress node 105 and the multipoint path.

As is known, the multipoint BFD control packets may include several BFD diagnostic codes or flags as set forth in Katz et al., "Bidirectional Forwarding Detection draft-ietf-bfd-base-08.txt," March, 2008. (henceforth referred to as Katz-08). These codes or flags may include No Diagnostic, Control Detection Time Expired, Echo Function Failed, Neighbor Signaled Session Down, Forwarding Plane Reset, Path Down, Concatenated Path Down, Administratively Down and Reverse Concatenated Path Down. At least one of the diagnostic codes or flags may be used to indicate the source, e.g., video source, is unreachable or unreliable. For example, one diagnostic code is the "Path Down" diagnostic code. The "Path Down" diagnostic code may indicate a path upstream of the egress (or destination) node is inoperable. As another example, one diagnostic code is the "Neighbor Signaled Session Down" diagnostic code. The "Neighbor Signaled Session Down" diagnostic code may indicate a neighbor node has detected the BFD session is down.

The above description for using control packets as defined in Katz-08 to inform a downstream node, e.g. egress node, of a source, e.g., video source, failure is exemplary and example embodiments are not limited to the above method in any way. One skilled in the art will recognize that other control packet protocols may also be used and the choice is a design decision.

In step S240 the egress (or destination) node selects the primary path 145 for receiving traffic. A node selects a data path by activating the data path. Activating a data path is to cause a data path to start passing traffic. The establishment and activation of a data path are logically separate events. However, in an alternative embodiment establishment and activation of a data path may be invoked as one atomic action.

In step S245 the ingress node 105 determines if the source node, e.g., video source, 101 is reachable. In an example embodiment, control messages, configured by, for example, the source node, e.g., video source, 101 or the ingress node 105, are sent by the source node, e.g., video source, 101 and received by the ingress node 105. If the source node, e.g., video source, 101 is directly connected to the ingress node 105 by, for example, an internet protocol (IP) layer 1 connection, control messages may include link down or link up status indicators for the source node, e.g., video source, 101. If the source node, e.g., video source, 101 is connected to the ingress node 105 via a network connection, control messages may include route tracking and response messages between the ingress node 105 and the source node, e.g., video source, 101.

The source node, e.g., video source, 101 may be reachable if the control message is received and the control message indicates the link is up if the source node, e.g., video source, 101 is directly connected to the ingress node 105. The source node, e.g., video source, 101 may also be reachable if the route tracking message is received and the route tracking message indicates the source node, e.g., video source, is available if the source node, e.g., video source, 101 is connected to the ingress node 105 through a network.

By contrast, the source node, e.g., video source, 101 may be unreachable or unreliable if the control message is not received or the control message indicates the link is down if the source node, e.g., video source, 101 is directly connected to the ingress node 105. The source node, e.g., video source, 101 may also be unreachable or unreliable if the route tracking message is not received or the route tracking message indicates the source node, e.g., video source, is unavailable if the source node, e.g., video source, 101 is connected to the ingress node 105 through a network.

If in step S245 the ingress node 105 determines the source node, e.g., video source, 101 is unreachable or unreliable, the ingress node 105 may configure and send a triggered failure detection probe to a downstream node indicating source, e.g., video source, failure as shown in step S250. The downstream node may be, for example, egress (or destination) node 115. The triggered failure detection probe may be, for example, a control message sent by the ingress node 105 to the egress (or destination) node 115 with the "Path Down" diagnostic code set. The triggered failure detection probe may be, for example, a probe indicating failure over the UFD sessions as described above with regard to step S230.

The downstream node, for example egress node 115, may detect the control packet. Upon the detection of the control packet, the downstream node, e.g., egress node 115, determines that the source node, e.g., video source, 101 has been indicated as unreachable or unreliable. For example, egress node 115 may read the BFD control (probe) packet and determine that the "Path Down" flag is set.

In step S255 the egress (or destination) node selects the standby path 155 for receiving traffic. A node selects a data path by activating the data path. Activating a data path is to cause a data path to start passing traffic. The establishment and activation of a data path are logically separate events. However, in an alternative embodiment establishment and activation of a data path may be invoked as one atomic action.

In selecting the standby path 155, the egress (or destination) node 115 may also deactivate the primary path 145. Deactivating a data path is to cause a data path to stop passing traffic. The deactivation and activation of a data path are logically separate events. They may, however, be implemented or invoked as one atomic action.

If in step S245 the ingress node 105 determines that the source node, e.g., video source, 101 is reachable. The ingress node 105 may configure and send a triggered failure detection probe to a downstream node, e.g., egress node 115, indicating the source, e.g., video source, 101 is reachable. For example, the probe may have the "Path Down" diagnostic code not set. The source node, e.g., video source, 101 may be reachable if the control message is received and the control message indicates the source, e.g., video source, 101 is available. For example, egress (or destination) node 115 may read the BFD control (probe) packet and determine that the "Path Down" flag is not set.

Alternatively, the ingress node 105 may be configured to only send a triggered failure detection probe to a downstream node, e.g., egress node 115, indicating the source node, e.g., video source, 101 is not reachable. Therefore, if in step S245 the source node, e.g., video source, 101 is reachable, the ingress node takes no special action and does not trigger a failure detection probe to a downstream node, e.g., egress node 115.

If in step S245 the source node, e.g., video source, 101 is reachable, the egress node 115 selects the primary path 145 for receiving traffic as described above with regard to S240.

Figure 2B:
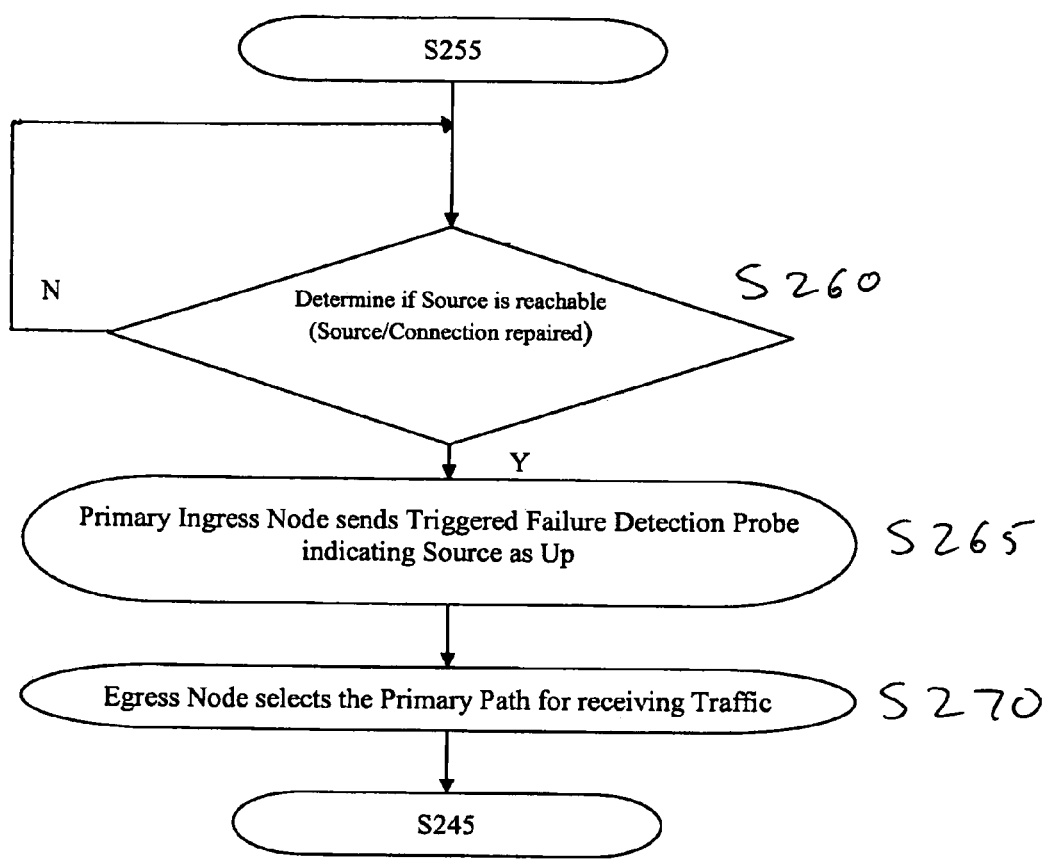

FIG. 2B illustrates a continuation of the example embodiment described above with regard to FIG. 2A. This example embodiment describes switching back to the primary path 145 as the source of data after the source node, e.g., video source, 101 was determined to be unreachable or unreliable in step S245.

In step S260 the ingress node 105 determines if the source node, e.g., video source, 101 is reachable. In an example embodiment, control messages, configured by, for example, the source node, e.g., video source, 101 or the ingress node 105, are sent by the source node, e.g., video source, 101 and received by the ingress node 105. If the source node, e.g., video source, 101 is directly connected to the ingress node 105 by, for example, an internet protocol (IP) layer 1 connection, control messages may include link down or link up status indicators for the source node, e.g., video source, 101. If the source node, e.g., video source, 101 is connected to the ingress node 105 via a network connection, control messages may include route tracking and response messages between the ingress node 105 and the source node, e.g., video source, 101.

The source node, e.g., video source, 101 may be reachable if the control message is received and the control message indicates the link is up if the source node, e.g., video source, 101 is directly connected to the ingress node 105. For example, the control messages may include link down or link up status indicators for the source node, e.g., video source, 101. The source node, e.g., video source, 101 may also be reachable if the route tracking message is received and the route tracking message indicates the source is available if the source node, e.g., video source, 101 is connected to the ingress node 105 through a network.

By contrast, the source node, e.g., video source, 101 may be unreachable or unreliable if the control message is not received or the control message indicates the link is down if the source node, e.g., video source, 101 is directly connected to the ingress node 105. The source node, e.g., video source, 101 may also be unreachable or unreliable if the route tracking message is not received or the route tracking message indicates the source is unavailable if the source node, e.g., video source, 101 is connected to the ingress node 105 through a network.

If in step S260 the ingress node 105 determines that the source node, e.g., video source, 101 is unreachable or unreliable, the ingress node 105 continues to monitor the status of the source node, e.g., video source, 101 by looping through step S260. If in step S245 the ingress node 105 determines that the source node, e.g., video source, 101 is reachable, in step S270 the egress (or destination) node 115 selects the standby path 155 for receiving traffic. A node selects a data path by activating the data path. Activating a data path is to cause a data path to start passing traffic. The establishment and activation of a data path are logically separate events. However, in an alternative embodiment establishment and activation of a data path may be invoked as one atomic action. In example embodiments, the method returns to step S245 and the ingress node 105 monitors the status of the source node, e.g., video source, 101.

Figure 3A:
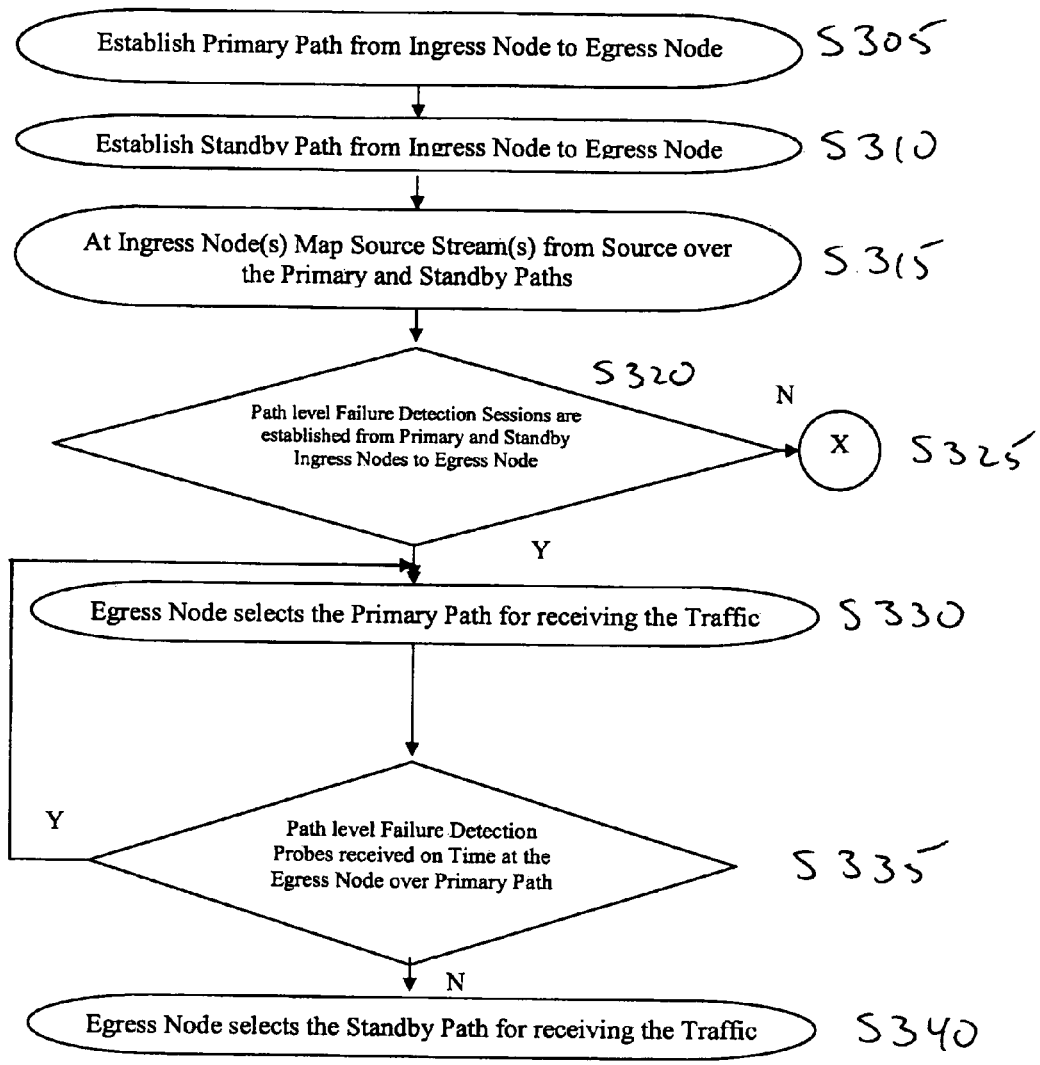
FIGS. 3A and 3B illustrate a method for detecting node or link failure in a point to multi-point network according to an example embodiment.

FIG. 3A illustrates another example embodiment of a method for detecting node or link failure in a point to multipoint network.

In step S305 the ingress node 105 establishes a primary data path using the same method as step S205 described above with regard to FIG. 2A. A data path or route may be defined in one of two ways. First, a data path may be defined as hop by hop routing. Hop by hop routing allows each node to independently choose the next hop for each forwarding equivalence class (FEC). A FEC is a group of IP packets which are forwarded in the same manner (e.g., over the same path, with the same forwarding treatment).

Second, as defined above, a data path may be explicitly defined. In an explicitly routed LSP data path, each node does not independently choose the next hop. A single node, generally the ingress node, specifies the nodes in the ISP. Other path definitions as are known to those skilled in the art may also be used and the choice may be a design decision.

In step S310 the ingress node 120 establishes a secondary data path. The secondary data path may be established as a hop by hop route or explicitly using the same method as step S205 as described above with regard to FIG. 2A.

As set forth in RFC 3036, a set of procedures and messages is established by which Label Switched Routers (LSRs) establish Label Switched Paths (LSPs) through a network by mapping network-layer routing information directly to data-link layer switched paths. These LSPs may have an endpoint at a directly attached neighbor, or may have an endpoint at a network egress (or destination) node, enabling switching via all intermediary nodes. The process of mapping network-layer routing information directly to data-link layer switched paths is known by those skilled in the art as mapping source, e.g., video source, streams.

In step S315 the ingress nodes (e.g., nodes 105 and 120) map source, e.g., video source, streams from the source node, e.g., video source, 101 over the primary 145 and standby 155 paths.

In step S320 the ingress nodes 105, 120 establish path level failure detection sessions from the primary ingress node 105 and standby ingress node 120 to egress (or destination) node 115. If the failure detections sessions fail to be established, the method moves to step S325 and the method ends. The establishment of path level failure detection sessions in step S320 is the same as step S230 discussed above with regard to FIG. 2A.

If established, then in step S330 the egress (or destination) node 115 selects the primary path 145 for receiving traffic. A node selects a data path by activating the data path. Activating a data path is to cause a data path to start passing traffic. The establishment and activation of a data path are logically separate events. However, in an alternative embodiment establishment and activation of a data path may be invoked as one atomic action.

In step S335 the egress (or destination) node 115 determines if failure detection probes are received on time over the primary data path. Failure detection probes may be control packets received within a specified time interval. The failure detection probes may be associated with multipoint BFD control packets.

The multipoint BFD control packets may have a "DesiredMinTxInterval" and a "RequiredMinRxInterval" field. The "DesiredMinTxInterval" is the minimum interval, in microseconds, that the local system would like to use when transmitting BFD control packets. The "RequiredMinRxInterval" is the minimum interval, in microseconds, between received BFD control packets that this system is capable of supporting.

The multipoint BFD control packets may have the "DesiredMinTxInterval" and the "RequiredMinRxInterval" fields set based on design criteria. The design criteria may be a maximum time such that an end user will not notice an interruption of services should a node or link fail. For example, the time may be no more than 1 second.

If in step S335 the egress (or destination) node 115 does not receive the control packets within the time interval, in step S340, the standby path may be selected, by the egress (or destination) node 115, for receiving the traffic. A node selects a data path by activating the data path. Activating a data path is to cause a data path to start passing traffic. The establishment and activation of a data path are logically separate events. However, in an alternative embodiment establishment and activation of a data path may be invoked as one atomic action.

In selecting the standby path 155, the egress (or destination) node 115 may also deactivate the primary path 145. Deactivating a data path is to cause a data path to stop passing traffic. The deactivation and activation of a data path are logically separate events. They may, however, be implemented or invoked as one atomic action.

Control packets may not be received if any system in the primary data path (e.g., a node or a communication link) becomes inoperable. For example, the control packet may be interrupted if intermediate node 110 becomes inoperable.

Figure 3B:
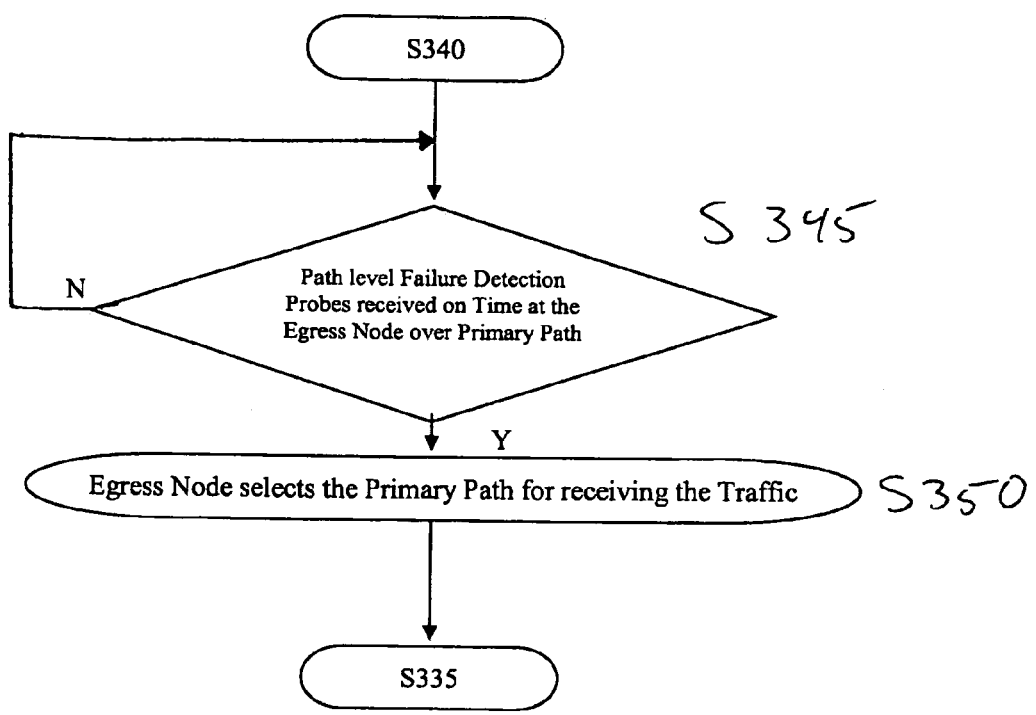

FIG. 3B illustrates a continuation of the example embodiment described above with regard to FIG. 3A. This example embodiment describes switching back to the primary path 145 as the source node, e.g., video source, of data after the egress (or destination) node 115 selected the standby path because the failure detection probes were not received within a specified time interval. Step S345 continues the monitoring of the failure detection probes to determine if the failure detection probes are received over the primary path once again.

In step S345 the egress node 115 determines if failure detection probes are received on time over the primary data path. Failure detection probes may be control packets received within a specified time interval. The failure detection probes may be associated with multipoint BFD control packets. In addition to the My Discr and Your Discr fields, the multipoint BFD control packets may have a "DesiredMinTxInterval" and a "RequiredMinRxInterval" field.

The "DesiredMinTxInterval" is the minimum interval, in microseconds, that the local system would like to use when transmitting BFD control packets. The "RequiredMinRxInterval" is the minimum interval, in microseconds, between received BFD control packets that this system is capable of supporting. The design criteria may be a maximum time such that an end user will not notice an interruption of services should a node or link fail. For example, the time may be no more than 1 second.

If in step S345 the egress (or destination) node 115 receives the control packets within the time interval, in step S350, the primary path may be selected, by the egress node 115, for receiving the traffic. A node selects a data path by activating the data path. Activating a data path is to cause a data path to start passing traffic. The establishment and activation of a data path are logically separate events. However, in an alternative embodiment establishment and activation of a data path may be invoked as one atomic action. In example embodiments, the method returns to step S335 and the egress (or destination) node 115 monitors the status of the failure detection probes.

As will be understood by one of ordinary skill in the art, the above described example embodiments may be implemented as software code segments stored on a recordable medium and executed by a processor. The recordable medium and processor may be a memory and processor as functional components of, for example, a label switched router LSR.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method of detecting upstream source failure in a point to multi-point network, the multi-point network including a source node configured to send data through a first node to reach a downstream node, the method comprising:
receiving first control packets, by the first node, from the source node, the first control packets indicating the status of the source node, the status including an indication of whether the source node is reachable;
determining, at the first node, if the source node is operational and if a connection path between the first node and the source node is operational based on the received first control packets; and
sending a second control packet from the first node to the downstream node, if one of (1) the source node is non-operational, and (2) the connection is non-operational, the second control packet including at least one value indicating the source node is unreliable and instructing the downstream node to switch from a first path between the downstream node and the source node to an alternative path between the downstream node and the source node.

2. The method of claim 1, further comprising:
sending a third control packet to the downstream node if the source node is operational and the connection to the source node is operational, the third control packet including at least one value indicating the source node is reliable, wherein the sending of the third control packets includes the at least one value indicating the source node is reliable such that the downstream node switches from the alternative path back to the first path.

3. The method of claim 1, wherein the point to multi-point network is a multi-protocol label switching (MPLS) network including a plurality of nodes configured to use resource reservation protocol (RSVP) and traffic engineering (TE), the MPLS network being a network of virtual links between nodes configured to encapsulate packets of various protocols, RSVP being a transport layer protocol configured to reserve resources across a network for an integrated services internet and TE being an extension of RSVP and configured to consider network constraint parameters when reserving network resources.

4. The method of claim 3, wherein one or more paths formed in the MPLS network are point to multi-point label switched paths (LSP), the LSP being a path through the MPLS network setup by a signaling protocol.

5. The method of claim 4, wherein the first control packets are associated with one of (1) a link down event, the link down event being a layer 1 failure detection, if the source node is directly connected to the first node of the point to multi-point network and (2) route tracking a remote source if the source node is not directly connected to the first node of the point to multi-point network.

6. The method of claim 4, wherein the second control packets are unidirectional failure detection (UFD) protocol packets associated with a UFD session sent over the point to multi-point label switched paths (LSP), the UFD protocol being a protocol configured to detect and communicate failures between nodes of a network.

7. The method of claim 6, wherein the second control packets include at least one of (1) a UFD no head flag set, (2) a UFD unreliable head flag set and (3) a UFD semi-reliable head flag set as the at least one value indicating the source is unreliable.

8. The method of claim 1, wherein the determining determines, by the first node, that the source node and the connection path are operational, if the first control packets are received by the first node and do not indicate that the source node and the connection path are non-operational, and
the second control packet sent from the first node to the downstream node informs the downstream node if the upstream source failure has occurred.

9. A method of detecting upstream source failure in a point to multi-point network, the multi-point network including a source node configured to send data through first nodes to reach a downstream node, the method comprising:
receiving, at the downstream node, data packets and primary control packets at a fixed interval via a primary path between the source node and the downstream node in the point to multi-point network, the data packets being an information stream received from the source node, the primary control packets originating from one of the first nodes and indicating the availability of the source node and a condition of the primary path;
determining, by the downstream node, if the primary control packets have been received within the fixed time interval;
first switching, at the downstream node, from the primary path to a secondary path between the source node and the downstream node, if the primary control packets have not been received within the fixed time interval, the secondary path not including the one of the first nodes that originated the primary control packets;
receiving the data packets and secondary control packets via the secondary path, the secondary control packets originating from another one of the first nodes;
determining after the first switch if the primary control packets are arriving within the fixed time interval; and
second switching from the secondary path to the primary path, if the primary control packets are arriving within the fixed time interval.

10. The method of claim 9, wherein the point to multi-point network is a multi-protocol label switching (MPLS) network including a plurality of nodes configured to use resource reservation protocol (RSVP) and traffic engineering (TE), the MPLS network being a network of virtual links between nodes configured to encapsulate packets of various protocols, RSVP being a transport layer protocol configured to reserve resources across a network for an integrated services internet and TE being an extension of RSVP and configured to consider network constraint parameters when reserving network resources.

11. The method of claim 10, wherein one or more paths formed in the MPLS network are point to multi-point label switched paths (LSP) being a path through the MPLS network setup by a signaling protocol.

12. The method of claim 11, wherein the primary control packets are unidirectional failure detection (UFD) protocol packets associated with a UFD session sent over the point to multi-point label switched paths (LSP), the UFD protocol being a protocol configured to detect and communicate failures between nodes of a network.

13. The method of claim 9, wherein the primary control packets and the secondary control packets that originate from the first nodes are failure detection probes that indicate if the upstream source failure has occurred, and
the first switching and the second switching are performed by the downstream node based on the failure detection probes.

14. A first node of a point to multi-point network, the multi-point network including a source node configured to send data through a first node to reach a downstream node, the first node comprising:
a first port configured to communicate with the source node;
a second port configured to communicate with the downstream node; and
a processor configured to,
receive, at the first node, first control packets from the source node, the first control packets indicating the status of the source node, the status including an indication of whether the source node is reachable,
determine, at the first node, if the source node is operational and if a connection path between the first node and the source node is operational based on the received first control packets, and
send a second control packet from the first node to the downstream node if one of (1) the source node is non-operational, and (2) the connection is non-operational, the second control packet including at least one value indicating the source node is unreliable and instructing the downstream node to switch from a first path between the downstream node and the source node to an alternative path between the downstream node and the source node.

15. The first node of claim 14, wherein the processor at the first node determines that the source node and the connection path are operational, if the first control packets are received by the first node and do not indicate that the source node and the connection path are non-operational, and
the second control packet sent from the first node to the downstream node informs the downstream node if an upstream source failure has occurred.

16. A downstream node of a point to multi-point network, the multi-point network including a source node configured to send data through first nodes to reach a downstream node, the downstream node comprising:
- a first port configured to receive primary data packets originating from the source node and primary control packets originating from one of the first nodes, the primary data packets and the primary control packets received by the first port via a primary data path between the source node and the downstream node in the point to multi-point network, the primary data packets being a source of an information stream, the primary control packets indicating the availability of the source of the information and a condition of the primary path;
- a second port configured to receive secondary data packets originating from the source node and secondary control packets originating from one of the first nodes, the secondary data packets and the secondary control packets received by the second port via a secondary data path between the source node and the downstream node in the point to multi-point network, the secondary path not including the one of the first nodes that originated the primary control packets; and
- a processor configured to,
  - receive the primary control packets at a fixed time interval,
  - determine if the primary control packets have been received within the fixed time interval, and
  - switch from the primary data path to the secondary data path if the primary control packets have not been received within the fixed time interval.

17. The downstream node of claim 16, wherein the primary control packets and the secondary control packets that originate from the first nodes are failure detection probes that indicate if an upstream source failure has occurred, and
the switching is performed by the downstream node based on the failure detection probes.

* * * * *